United States Patent
Sawal et al.

(10) Patent No.: US 12,284,098 B2
(45) Date of Patent: Apr. 22, 2025

(54) METHOD AND SYSTEM FOR MANAGING NETWORK ON LIFE SUPPORT

(71) Applicant: Dell Products L.P., Round Rock, TX (US)

(72) Inventors: Vinay Sawal, Fremont, CA (US); Udhaya Chandran Shanmugam, Santa Clara, CA (US); Senthil Kumar Ganesan, San Ramon, CA (US); Kannan Karuppiah, Fremont, CA (US); Vinoth Kumar Arumugam, Fremont, CA (US)

(73) Assignee: Dell Products L.P., Round Rock, TX (US)

( * ) Notice: Subject to any disclaimer, the term of this patent is extended or adjusted under 35 U.S.C. 154(b) by 0 days.

(21) Appl. No.: 18/099,929

(22) Filed: Jan. 21, 2023

(65) Prior Publication Data

US 2024/0250890 A1    Jul. 25, 2024

(51) Int. Cl.
*H04L 43/0817* (2022.01)
*H04L 41/0654* (2022.01)
*H04L 43/16* (2022.01)

(52) U.S. Cl.
CPC ...... *H04L 43/0817* (2013.01); *H04L 41/0654* (2013.01); *H04L 43/16* (2013.01)

(58) Field of Classification Search
CPC .. H04L 43/0817; H04L 41/0654; H04L 43/16
USPC .................................................. 709/223–227
See application file for complete search history.

(56) References Cited

U.S. PATENT DOCUMENTS

| | | | | |
|---|---|---|---|---|
| 7,032,119 | B2 * | 4/2006 | Fung | G06F 1/3221 |
| | | | | 713/323 |
| 7,257,644 | B2 * | 8/2007 | Simonnet | H04B 3/542 |
| | | | | 709/204 |
| 7,693,042 | B1 * | 4/2010 | Wei | H04L 43/0817 |
| | | | | 370/242 |
| 8,793,365 | B2 * | 7/2014 | Arsovski | G06F 9/5094 |
| | | | | 709/224 |
| 10,530,638 | B2 * | 1/2020 | Hanley | H04L 41/0668 |
| 10,666,996 | B1 * | 5/2020 | Nair | H04N 21/6118 |
| 11,265,206 | B1 * | 3/2022 | Satish | H04L 41/065 |
| 11,381,485 | B1 * | 7/2022 | Banerjee | H04L 43/0817 |
| 2008/0046971 | A1 * | 2/2008 | Swander | H04L 63/1433 |
| | | | | 726/4 |
| 2010/0194524 | A1 * | 8/2010 | Campero | H04L 12/2829 |
| | | | | 340/3.1 |
| 2012/0053741 | A1 * | 3/2012 | Beyerle | G05F 5/00 |
| | | | | 700/291 |
| 2019/0068738 | A1 * | 2/2019 | Ganjam | H04L 41/0213 |
| 2019/0089611 | A1 * | 3/2019 | Kondalam | H04L 43/10 |

(Continued)

*Primary Examiner* — Sargon N Nano
(74) *Attorney, Agent, or Firm* — Terrile, Cannatti & Chambers, LLP; Emmanuel A. Rivera

(57) ABSTRACT

Described herein are methods and a system for placing a network and devices in life support when it is determined that a network event necessitates such. Interconnected devices on the network are monitored, devices providing status such as temperature. Based on status, a life support event is determined. If it is determined that life support is needed, devices and services are prioritized. Monitoring is performed as to changes in the network and devices. The network and devices are returned to normal operation if the monitoring determines a normal status.

20 Claims, 6 Drawing Sheets

(56) References Cited

U.S. PATENT DOCUMENTS

2019/0349245 A1* 11/2019 Hanley ............... H04L 41/0668
2020/0174509 A1*  6/2020 Dai ................... H02J 13/00016

* cited by examiner

METHOD AND SYSTEM FOR MANAGING NETWORK ON LIFE SUPPORT

BACKGROUND OF THE INVENTION

Field of the Invention

The present invention relates to managing networks at data centers. More specifically, embodiments of the invention provide for analyzing networks of data centers and placing devices of networks on life support when energy needs are to be conserved.

Description of the Related Art

Data centers, such as those installed and operated at physical sites of entities including customers of infrastructures, are equipped and include a variety of devices. The devices can include networking, storage, switching, computing, etc. The devices are interconnected to one another, and rely on power and cooling. The data centers are configured to provide the necessary power and cooling to the devices and their infrastructures (e.g., networks). Typically, some redundancy or backup is provided, such that when one device (e.g., node in a network) fails, another device(s) (e.g., node) takes over.

In certain instances, emergency situations can take place, such as natural disasters, power grid failures, human error, etc. Such emergency situations can require a proactive and aggressive energy conservation as to a data center and networks. The data center in essence is placed in life support, where only certain devices or nodes are operated that are critical and running necessary services. It is therefore, necessary to efficiently determine which devices to place on life support and properly manage power and cooling of the data center, networks, and devices.

SUMMARY OF THE INVENTION

A computer-implementable method, system and computer-readable storage medium for implementing life support on a network comprising: monitoring status of neighbor or interconnected devices in the network; determining if a life support event occurs based on monitored status of the devices; prioritizing devices and services to support a life support if the life support event is determined; monitoring changes as to the devices and life support event; and returning to normal operation if the devices and life support are monitored as normal.

BRIEF DESCRIPTION OF THE DRAWINGS

The present invention may be better understood, and its numerous objects, features and advantages made apparent to those skilled in the art by referencing the accompanying drawings. The use of the same reference number throughout the several figures designates a like or similar element.

DETAILED DESCRIPTION

Implementations described herein provide for life support for life support for networks when an emergency situation happens. Life support includes placing prioritizing certain devices and services of the network, and disabling other devise and networks. Furthermore, implementations provide for implementing optimization options, such as reducing operations/features of devices when particular stages are determined. Auto triggering can be implemented, as well as auto remediation, avoiding manual intervention.

In various implementations the Link Layer Discovery Protocol (LLDP) is used to detect device temperature and network level events. Two LLDP type, length, and value (TLV) or LLDP_TV are provided, TEMP_TLV and NET_EVENT_TLV which are used to identify a life support and for remediation.

Various implementations provide for five phases, which include identify the life support event, confirming the event, implementing a life support protocol, monitoring for changes, and clearing changes (i.e., take network and devise off of life support)

For purposes of this disclosure, an information handling system may include any instrumentality or aggregate of instrumentalities operable to compute, classify, process, transmit, receive, retrieve, originate, switch, store, display, manifest, detect, record, reproduce, handle, or utilize any form of information, intelligence, or data for business, scientific, control, gaming, or other purposes. For example, an information handling system may be a personal computer, a network storage device, or any other suitable device and may vary in size, shape, performance, functionality, and price. The information handling system may include random access memory (RAM), one or more processing resources such as a central processing unit (CPU) or hardware or software control logic, ROM, and/or other types of nonvolatile memory. Additional components of the information handling system may include one or more disk drives, one or more network ports for communicating with external devices as well as various input and output (I/O) devices, such as a microphone, keyboard, a video display, a mouse, etc. The information handling system may also include one or more buses operable to transmit communications between the various hardware components.

Figure 1:
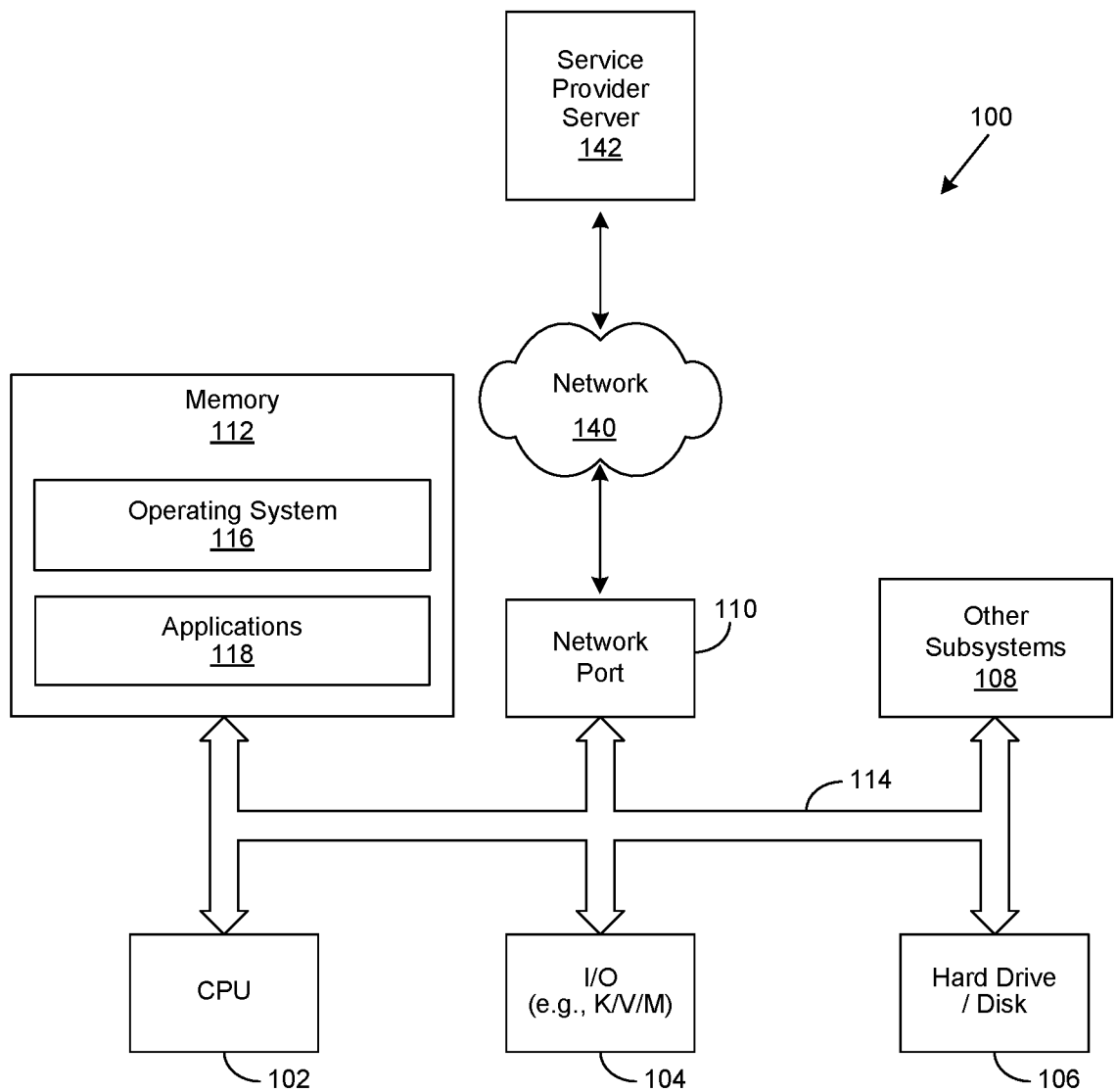
FIG. 1 is a general illustration of components of an information handling system as implemented in the present invention.

FIG. 1 is a generalized illustration of an information handling system (IHS) 100 that can be used to implement the system and method of the present invention. The information handling system (IHS) 100 includes a processor (e.g., central processor unit or "CPU") 102, input/output (I/O) devices 104, such as a microphone, a keyboard, a video display or display device, a mouse, and associated controllers (e.g., K/V/M), a hard drive or disk storage 106, and various other subsystems 108.

In various embodiments, the information handling system (IHS) 100 also includes network port 110 operable to connect to a network 140, where network 140 can include one or more wired and wireless networks, including the Internet. Network 140 is likewise accessible by a service provider server 142.

The information handling system (IHS) 100 likewise includes system memory 112, which is interconnected to the foregoing via one or more buses 114. System memory 112 can be implemented as hardware, firmware, software, or a combination of such. System memory 112 further includes an operating system (OS) 116 and applications 118.

Figure 2:
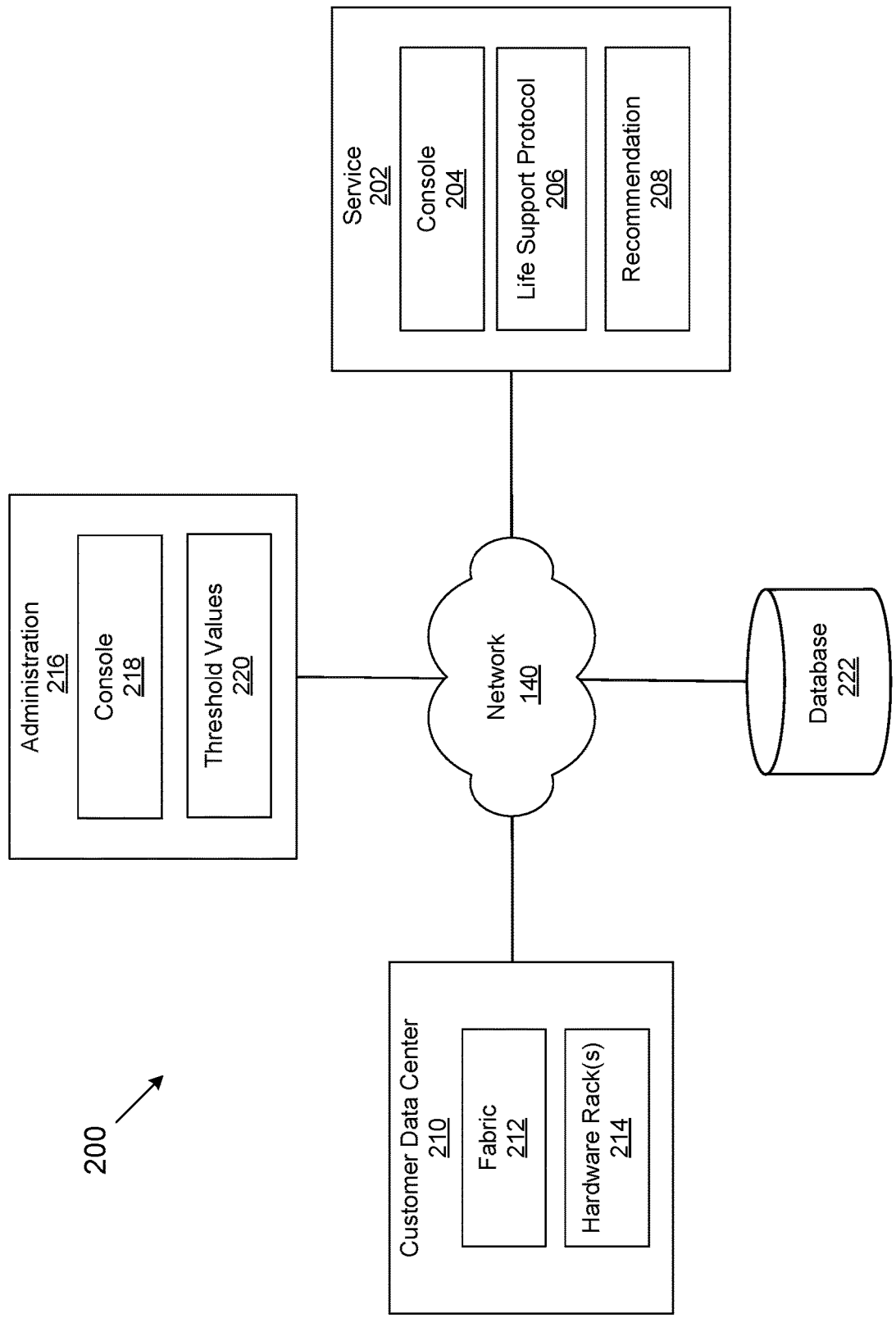
FIG. 2 is a system as implemented in the present invention.

FIG. 2 shows a system 200 that supports the processes described herein. Various implementations provide for the system 200 to include a service 202. Implementations provide for the service 202 to be part of data center of a provider that supports customers. In particular the provider supports devices and infrastructures, including hardware racks installed at a customer data center.

The service 202 can be implemented as a cloud computing, one or more physical computing devices (e.g., servers), etc. Implementations provide for the service to include one or more information handling system (IHS) 100 described above. Implementations provide for the service 202 to be accessible as website.

The service 202 can be implemented with a console 204 to allow a user to communicate with the service 202, allowing the user to enter or select values or inputs (e.g., data), and to receive output (e.g., recommendations, results) from the service 202.

Implementations provide for the service 202 to include a life support protocol 206 further described herein. The life support protocol 206 can be configured as a software application running on the service 202.

The service 202 further can include a recommendation component 208. The recommendation component 208 can be configured to provide the results generated by the life support protocol 206. For example, recommendation can include automatic enabling and disabling of certain devices at the customer data center in life support situation as described herein.

The service 202 is connected to network 140. As described above, network 140 can include one or more wired and wireless networks, including the Internet. Network 140 connects service 202 to a customer data center 210. The customer data center 210 includes a fabric 212, where fabric 212 represents an infrastructure architecture. The fabric 212 includes networks of components or devices. The devices are interconnected to one another as described herein, and can include devices that support networking, storage, switching, computing, etc.

Implementations provide for the customer data center 210 to include one or more hardware racks 214. In certain implementations, the hardware racks 214 are considered part of the fabric 212, and in other implementations are considered separate from the fabric 212. The hardware racks can include devices supported by the provider described above. Devices in the fabric 210 and hardware racks have a certain topology of interconnection, dependency, and redundancy, as further described herein.

Implementations provide for system 200 to include administration 216. Administration 216 can be configured or include one or more information for the service to include one or more information handling system (IHS) 100 described above. For example, administration 216 can be accessed by customer personnel, such as IT administrators, responsible for operations of customer data center 210. Such access can be through a console 218. Implementations provide for administration 216 to include or prescribed values, such as threshold values 220 that are used to implement life support instances.

The system 200 further can include a database 220. The database 216 can include the threshold values, any data related to the particular customer data center 210, including the devices of the customer data center 210.

Figure 3:
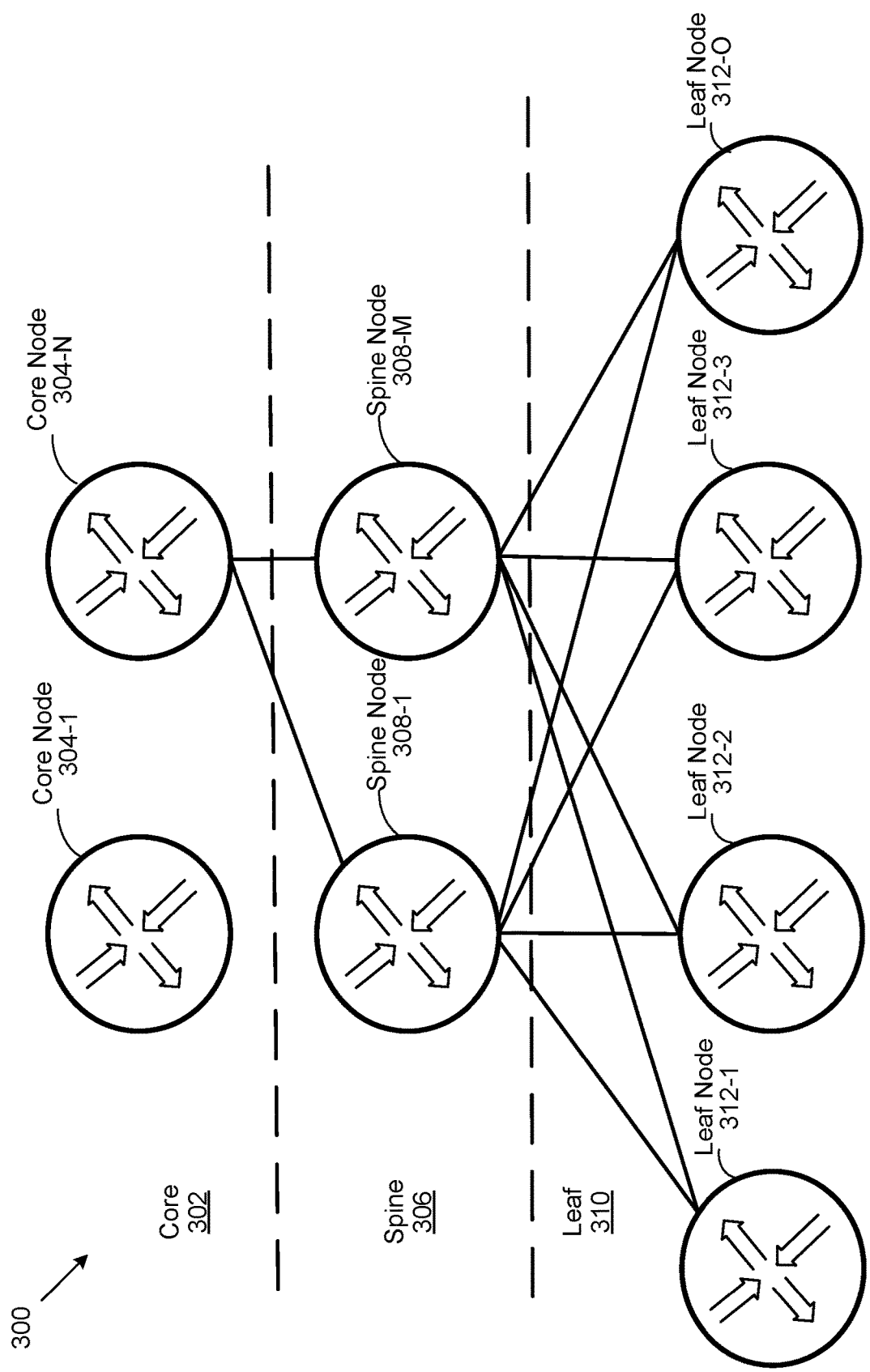
FIG. 3 illustrates a topology of devices in a fabric.

FIG. 3 shows a topology 300 of devices in a fabric. In various implementations, the topology 300 includes a core network 302 that is part of a data center (e.g., data center 210). Devices of the core network 302 are represented by one or more core nodes 304-1 to 304-2.

For various implementations, connected to the core network 302 is a spine-leaf architecture. Generally, a spine-leaf architecture includes two switching layers, a spine layer and leaf layer. A leaf layer can include access switches that aggregate traffic from devices and connect directly into a spine or network core. Spine switches interconnect all leaf switches in a full-mesh topology. Implementations can provide that every leaf switch in a spine-leaf architecture connects to every switch in the network fabric.

In this example, spine layer 306 includes one or more spine nodes 308-1 to 308-N. The spine nodes 308 represent devices. Leaf layer 310 includes one or more leaf nodes 312-1 to 312-O. The leaf nodes 312 represent devices. In various implementations, the leaf nodes 312 (i.e., devices) are integrated into hardware racks 214.

Example interconnections of topology 300 are shown between the nodes 304, 308, and 312. The topology 300 is designed to provide redundancy or backup between the nodes 304, 308, and 312. For example, certain spine nodes 308 are redundant with certain spine nodes 308, and can access the same and/or redundant leaf nodes 312. Therefore, in the event of an unexpected or planned take down of certain nodes 304, 308, and 312, redundancy or backup can be provided.

Figure 4:
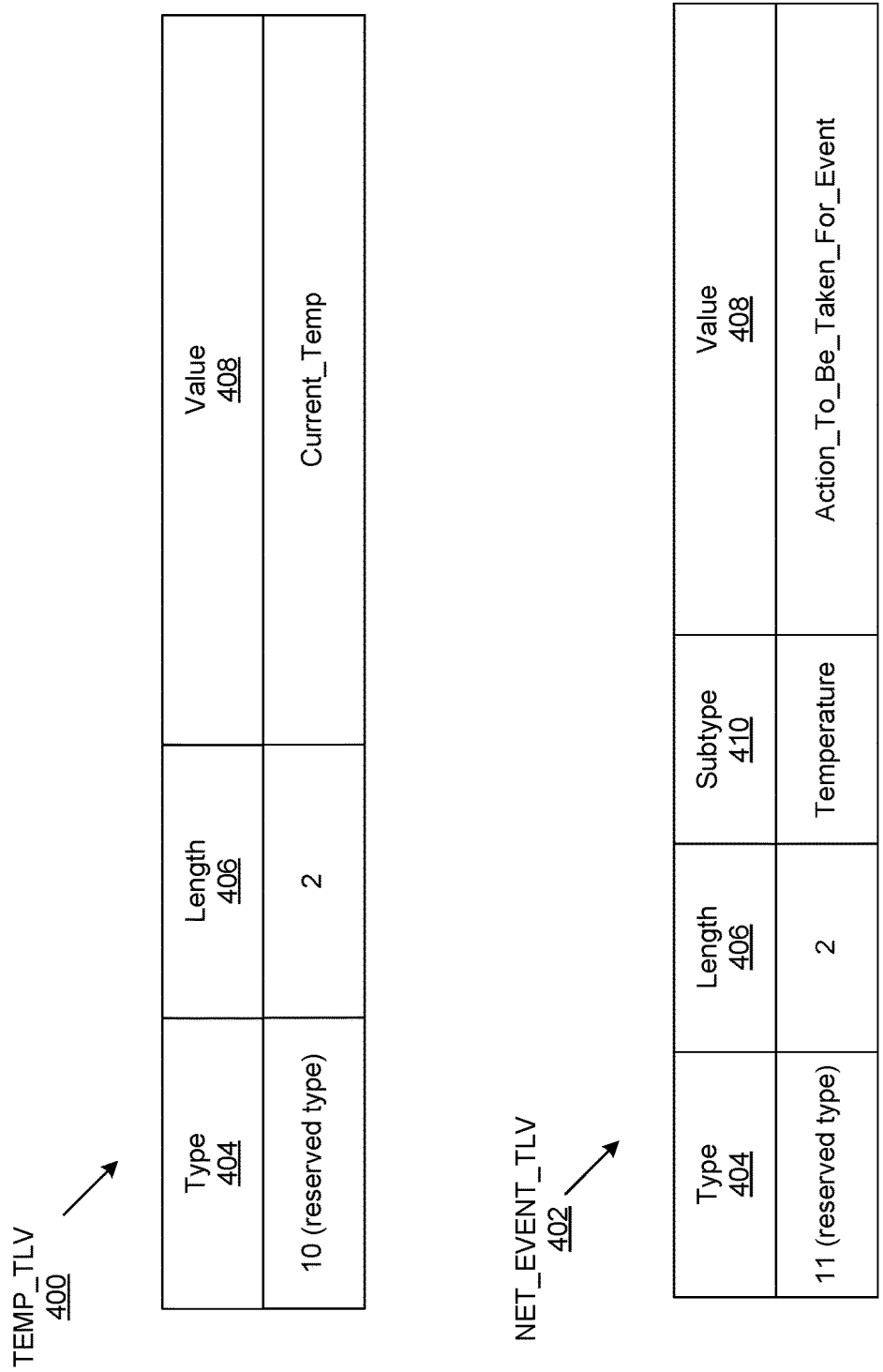
FIG. 4 illustrates of type, length, and value (TLV) used to determine life support events.

FIG. 4 shows examples of type, length, and value (TLV) used to determine life support events. The Link Layer Discovery Protocol (LLDP) is a vendor-neutral link layer protocol as based on IEEE 802 that can be used by network devices (e.g., nodes/devices 304, 308, and 312) for advertising their identity, capabilities, and neighbor devices. The LLDP can be used in devices (e.g., nodes 304, 308, and 312) for network management and network monitoring applications, such as life support protocol 206.

LLDP supports a set of attributes that it uses to learn information about neighbor devices. These attributes have a defined format known as a Type-Length-Value (TLV). LLDP supported devices (e.g., nodes 304, 308, and 312) can use TLVs to receive and send information regarding neighbor devices (e.g., nodes 304, 308, and 312).

In various implementations, nodes/devices 304, 308, and 312, implement LLDP. Particular TLVs are provided to support a network on life support. TEMP_TLV 400 is a specific TLV that is shared with interconnected devices (e.g., nodes 304, 308, and 312). The TEMP_TLV 400 advertises or shares temperature value of device e.g., nodes 304, 308, and 312) with neighbor/interconnected devices e.g., nodes 304, 308, and 312).

NET_EVENT_TLV 402 is a specific TLV that is generated based on the collective values received through TEMP_TLV 400. In other words, NET_EVENT_TLV 402 provides a net event condition based on the temperatures of neighbor/interconnected devices (e.g., nodes 304, 308, and 312). Therefore, if multiple devices provide a temperature over a threshold temperature, then a net event can indicate a network event. If only one device provides a temperature over the threshold, then an anomaly is assumed. No network event exists.

In certain implementations, the TEMP_TLV 400 is defined by field type 404 with a value of 10 (reserved type), field length 406 with a value of 2, field value 408 with a value Current_Temp. NET_EVENT_TLV 402 is defined by field type 404 with a value of 11 (reserved type), field length 406 with a value of 2, field value 408 with a value Action_To_Be_Taken_For_Event. Another field Subtype 410 has a value Temperature.

In certain implementations, as to security considerations, in addition to providing authorization for a network to go into life support (e.g., administration 216 authorization), a signature can be configured to validate authenticity of an LLDP TLV.

Figure 5:
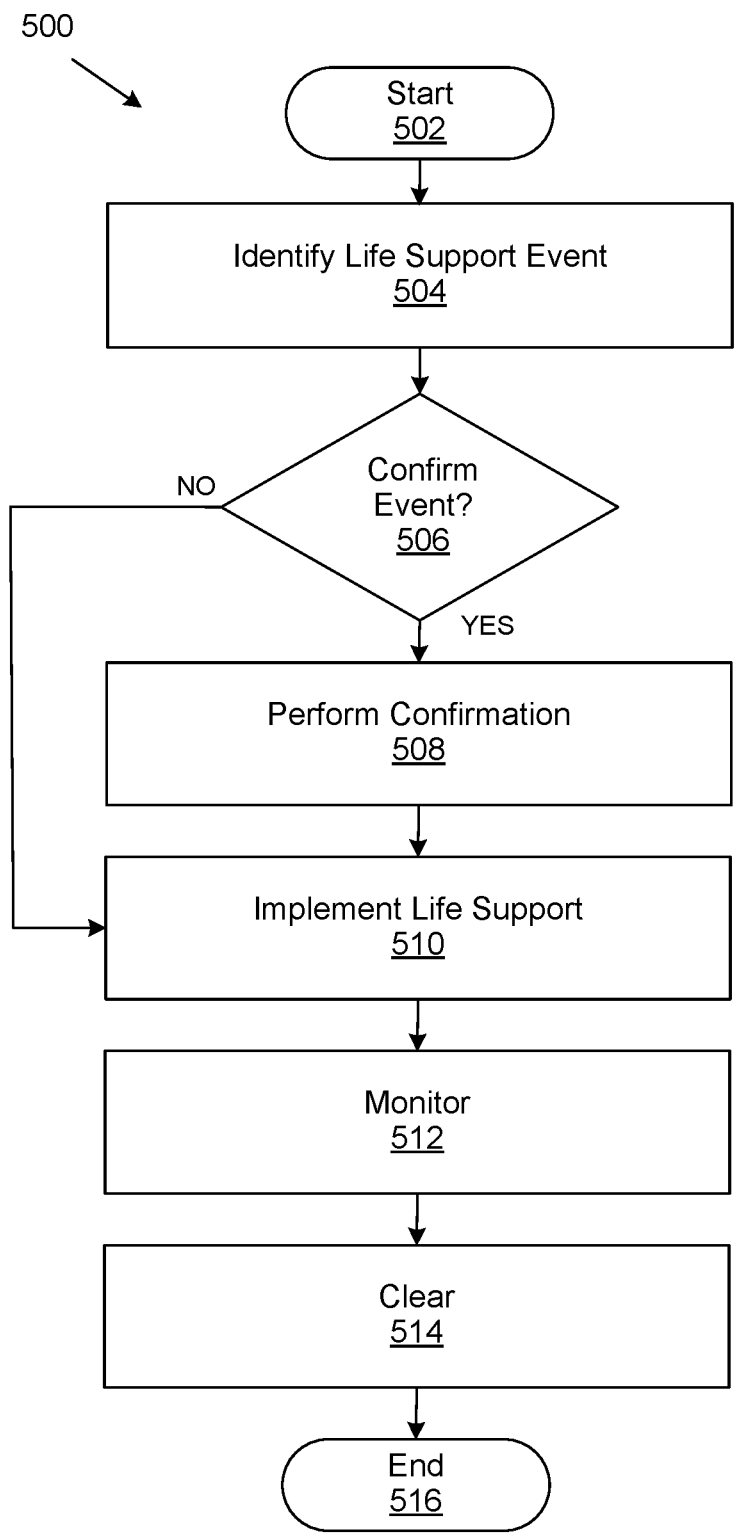
FIG. 5 is a generalized flowchart for analyzing networks of data centers and placing devices of networks on life support when energy needs are to be conserved.

FIG. 5 shows a generalized flowchart for analyzing networks of data centers and placing devices of networks on life support when energy needs are to be conserved. Implementations provide for the steps of process 500 to be performed by the system 200. The order in which the method is described is not intended to be construed as a limitation, and any number of the described method steps may be combined in any order to implement the method, or alternate method. Additionally, individual steps may be deleted from the method without departing from the spirit and scope of the subject matter described herein. Furthermore, the method may be implemented in any suitable hardware, software, firmware, or a combination thereof, without departing from the scope of the invention.

At step 502, the process 500 starts. At step 504, identifying of a life event is performed. An identification of a life support event can take place from various inputs, including alerts of power and cooling system failures. In certain instances, a life support event is triggered by administration (e.g., administration 216). Implementations provide for automatically identifying of life support events, within a network, based on peer discovery of interconnected or neighbor devices (e.g., nodes 304, 308, and 312).

As discussed, to provide automatic identification, implementations provide for the use of LLDP, and two LLDP TLVs, TEMP_TLV 400 and NET_EVENT_TLV 402. TEMP_TLV 400 provides local device (e.g., node) temperature information. NET_EVENT_TLV 402 provides various network level events, including a life support network event. The devices (e.g., nodes) send their TEMP_TLV 400 to peer/connected devices (e.g., nodes) using LLDP.

Implementations provide for the life support protocol 206 to receive all the TEMP_TLV 400. The life support protocol 206 calculates/determines if a local isolated event (e.g., event specific to device/node) or a network wide event has occurred. An administration configured threshold value (e.g., device temperature) can be used to determine whether a local event or network wide event has occurred. The life support protocol 206 using LLDP can send the life support network event to the peer/connected devices (e.g., nodes). LLDP sends NET_EVENT_TLV 402 received from the peer/connected devices (e.g., nodes). Based on information received from all the peer/connected devices (e.g., nodes), the life support protocol 206 calculates/determines if a network wide event has occurred. The calculation can be based on administration configuration as to a tolerance. By default, the information is to be received from all peer/connected devices (e.g., nodes).

At step 506, a determination is performed whether the event is to be confirmed. If confirmation is to be performed, following the YES branch of step 506, at step 508, confirmation is performed. If confirmation is not to be performed, following the NO branch of step 506, step 510 is performed.

At step 508, when confirmation is performed, an administrator (e.g., administration 216) can authorize a life support event, or the shutting down of certain devices and prioritizing particular devices to continue operation. Confirmation can take place to support security measures, such that devices or services are not taken down unnecessarily without proper security authorization. In the confirmation, administration (e.g., administration 216) can authorize the life support event. In certain implementations, the life support can be a configuration option to allow life support protocol 206 to enable/disable an auto trigger to authorize the life support event without approval from administration (e.g., administration 216). Auto trigger can also be performed after several attempts to reach the administration (e.g., administration 216).

At step 510, life support is implemented. Implementations provide for the use of the life support protocol 206. Implementations provide for life support as to various stages including emergency, critical, warning and normal. The administration (e.g., administration 216) can configure various life support safety measure options and prioritize the options for implementation order. The options can be mapped to the various stages. Based on stage and options, the life support feature (i.e., life support protocol 206) can be configured to certain safety measures including turning off the LEDs, slowing down fan speed, turning off redundant devices/nodes, shutting down ports which are configured with non-prioritized work load, bringing down blocked ports in spanning tree, slowing the down interval of control packets, by controlling max values of the respective protocol, etc.

At step 512, monitoring is performed. Implementations provide for the life support protocol 206 to monitor temperature events, administration configuration and alerts, and calculate stage level. Based on stage level, the life support protocol 206 implements corresponding stage level safety feature options. For various implementations, the life support protocol 206 is configured to perform an auto clear when a normal stage level is reached.

At step 514, clearing is performed. The life support protocol 206 can receive an "all clear" from an auto trigger or from administration (e.g., administration 216). When the "all clear" is received, the life support protocol 206 turns off any safety feature, and the network and devices revert to the original state. At step 516, the process 500 ends.

Figure 6:
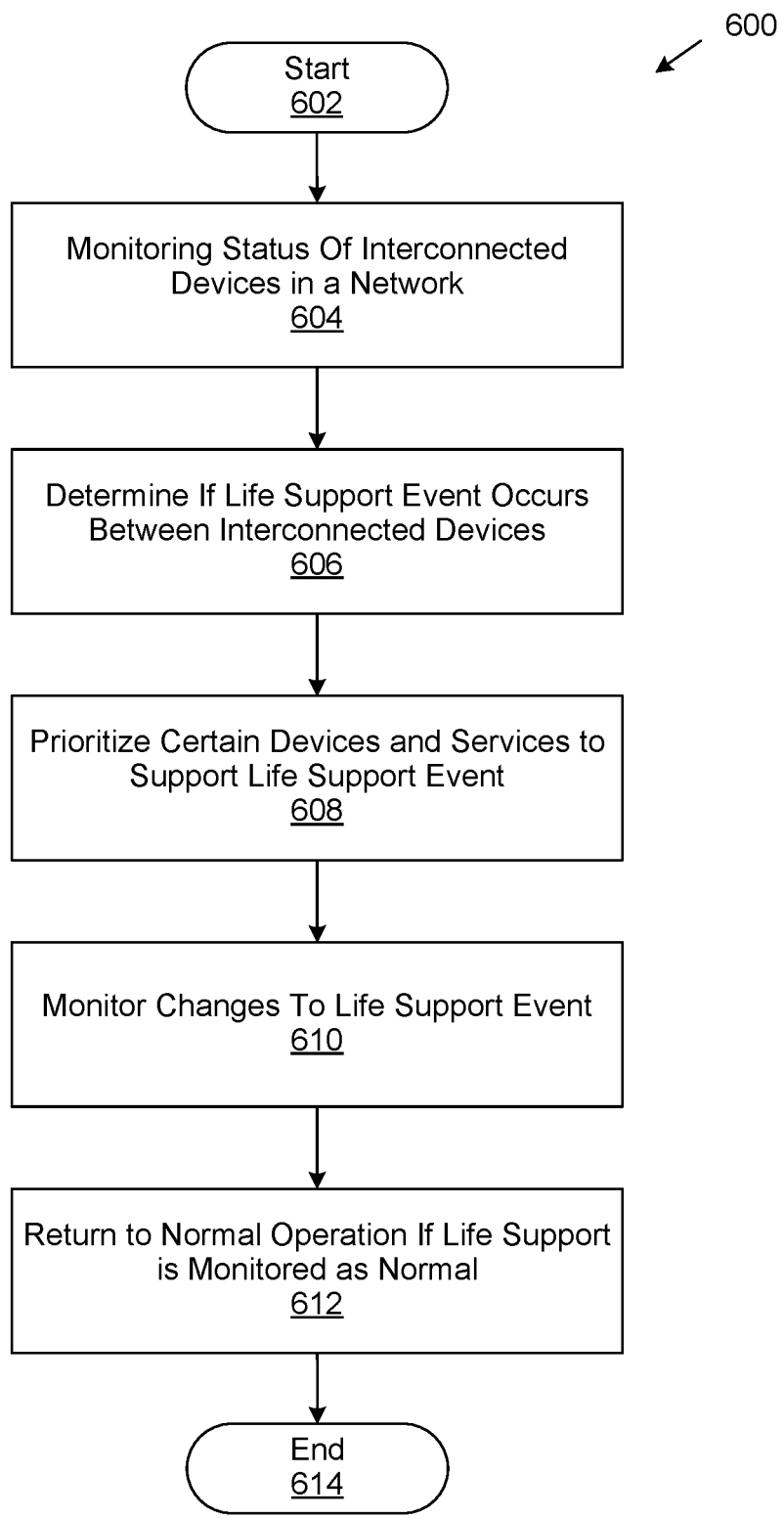
FIG. 6 is a generalized flowchart for implementing life support on a network.

FIG. 6 shows a generalized flowchart for implementing life support on a network. Implementations provide for the steps of process 600 to be performed by the service 202 and the life support protocol. The order in which the method is described is not intended to be construed as a limitation, and any number of the described method steps may be combined in any order to implement the method, or alternate method. Additionally, individual steps may be deleted from the method without departing from the spirit and scope of the subject matter described herein. Furthermore, the method may be implemented in any suitable hardware, software, firmware, or a combination thereof, without departing from the scope of the invention.

At step 602, the process 600 starts. At step 604, monitoring is performed as to the status of neighbor or interconnected devices in a network. Implementations provide for individual devices to provide their condition/status, such as temperature, through a protocol such as LLDP. For example, the use of TEMP_TLV 400 as described herein.

At step 606, a determining is performed as to a life support event, or an event necessitating placing the network in life support. The determining can be based on the status received from the devices. Based on the collective status of a net event, for example, NET_EVENT_TLV 402.

At 608, life support is implemented, if the determining is that of a life support event. Various stages may be determined, and actions based on the stages are performed. In various implementations, certain devices and services are prioritized to support the life support event.

At step 610, monitoring is performed as to any changes to the devices, and if the life support event has changed.

At step 612, the network and devices are returned to normal if the monitoring indicates normal condition in the devices and the network. At step 614, the process 600 ends.

The present invention is well adapted to attain the advantages mentioned as well as others inherent therein. While the present invention has been depicted, described, and is defined by reference to particular embodiments of the invention, such references do not imply a limitation on the invention, and no such limitation is to be inferred. The invention is capable of considerable modification, alteration, and equivalents in form and function, as will occur to those ordinarily skilled in the pertinent arts. The depicted and described embodiments are examples only and are not exhaustive of the scope of the invention.

As will be appreciated by one skilled in the art, the present invention may be embodied as a method, system, or computer program product. Accordingly, embodiments of the invention may be implemented entirely in hardware, entirely in software (including firmware, resident software, microcode, etc.) or in an embodiment combining software and hardware. These various embodiments may all generally be referred to herein as a "circuit," "module," or "system." Furthermore, the present invention may take the form of a computer program product on a computer-usable storage medium having computer-usable program code embodied in the medium.

Any suitable computer usable or computer readable medium may be utilized. The computer-usable or computer-readable medium may be, for example, but not limited to, an electronic, magnetic, optical, electromagnetic, infrared, or semiconductor system, apparatus, or device. More specific examples (a non-exhaustive list) of the computer-readable medium would include the following: a portable computer diskette, a hard disk, a random-access memory (RAM), a read-only memory (ROM), an erasable programmable read-only memory (EPROM or Flash memory), a portable compact disc read-only memory (CD-ROM), an optical storage device, or a magnetic storage device. In the context of this document, a computer-usable or computer-readable medium may be any medium that can contain, store, communicate, or transport the program for use by or in connection with the instruction execution system, apparatus, or device.

Computer program code for carrying out operations of the present invention may be written in an object-oriented programming language such as Java, Smalltalk, C++ or the like. However, the computer program code for carrying out operations of the present invention may also be written in conventional procedural programming languages, such as the "C" programming language or similar programming languages. The program code may execute entirely on the user's computer, partly on the user's computer, as a stand-alone software package, partly on the user's computer and partly on a remote computer or entirely on the remote computer or server. In the latter scenario, the remote computer may be connected to the user's computer through a local area network (LAN) or a wide area network (WAN), or the connection may be made to an external computer (for example, through the Internet using an Internet Service Provider).

Embodiments of the invention are described with reference to flowchart illustrations and/or step diagrams of methods, apparatus (systems) and computer program products according to embodiments of the invention. It will be understood that each step of the flowchart illustrations and/or step diagrams, and combinations of steps in the flowchart illustrations and/or block diagrams, can be implemented by computer program instructions. These computer program instructions may be provided to a processor of a general-purpose computer, special purpose computer, or other programmable data processing apparatus to produce a machine, such that the instructions, which execute via the processor of the computer or other programmable data processing apparatus, create means for implementing the functions/acts specified in the flowchart and/or block diagram step or steps.

These computer program instructions may also be stored in a computer-readable memory that can direct a computer or other programmable data processing apparatus to function in a particular manner, such that the instructions stored in the computer-readable memory produce an article of manufacture including instruction means which implement the function/act specified in the flowchart and/or block diagram block or blocks.

The computer program instructions may also be loaded onto a computer or other programmable data processing apparatus to cause a series of operational steps to be performed on the computer or other programmable apparatus to produce a computer implemented process such that the instructions which execute on the computer or other programmable apparatus provide steps for implementing the functions/acts specified in the flowchart and/or block diagram block or blocks.

The present invention is well adapted to attain the advantages mentioned as well as others inherent therein. While the present invention has been depicted, described, and is defined by reference to particular embodiments of the invention, such references do not imply a limitation on the invention, and no such limitation is to be inferred. The invention is capable of considerable modification, alteration, and equivalents in form and function, as will occur to those ordinarily skilled in the pertinent arts. The depicted and described embodiments are examples only and are not exhaustive of the scope of the invention.

Consequently, the invention is intended to be limited only by the spirit and scope of the appended claims, giving full cognizance to equivalents in all respects.

What is claimed is:

1. A computer-implementable method for implementing life support on a network comprising:
    monitoring status of Link Layer Discovery Protocol (LLDP) implemented neighbor or interconnected devices as to temperature and network level events of the devices;
    receiving LLDP attributes from the neighbor or interconnected devices to determine if local or network event has occurred, wherein LLDP attributes include temperatures of, event conditions based on threshold temperatures of, and actions to be taken on neighbor or interconnected devices;
    prioritizing devices and services to support a life support if the life support event is determined;
    monitoring changes as to the devices and life support event; and
    returning to normal operation if the devices and life support are monitored as normal.

2. The computer-implementable method of claim 1, wherein the monitoring comprises identifying of status of individual devices, where each device provides status.

3. The computer-implementable method of claim 1, wherein the monitoring status and determining implement LLDP and status is provided as type, length, and value (TLV).

4. The computer-implementable method of claim 1, wherein the life support comprises various stages and implementing safety options based on a particular stage.

5. The computer-implementable method of claim 1, wherein the determining is based on predetermined threshold values.

6. The computer-implementable method of claim 1, wherein the returning is performed by an auto trigger.

7. The computer-implementable method of claim 1 further comprising confirming the life support event and allowing the life support to take place.

8. A system comprising:
a plurality of processing systems communicably coupled through a network, wherein the processing systems include non-transitory, computer-readable storage medium embodying computer program code interacting with a plurality of computer operations for implementing life support on a network comprising, wherein processors of the processing systems are configured to perform:
monitoring status of Link Layer Discovery Protocol (LLDP) implemented neighbor or interconnected devices as to temperature and network level events of the devices;
receiving LLDP attributes from the neighbor or interconnected devices to determine if local or network event has occurred, wherein LLDP attributes include temperatures of, event conditions based on threshold temperatures of, and actions to be taken on neighbor or interconnected devices;
determining if a life support event occurs based on monitored status of the devices;
prioritizing devices and services to support a life support if the life support event is determined;
monitoring changes as to the devices and life support event; and
returning to normal operation if the devices and life support are monitored as normal.

9. The system of claim 8, wherein the monitoring comprises identifying of status of individual devices, where each device provides status.

10. The system of claim 8, wherein the monitoring status and determining implement LLDP and status is provided as type, length, and value (TLV).

11. The system of claim 8, wherein the life support comprises various stages and implementing safety options based on a particular stage.

12. The system of claim 8, wherein the determining is based on predetermined threshold values.

13. The system of claim 8, wherein the returning is performed by an auto trigger.

14. The system of claim 8, further comprising confirming the life support event and allowing the life support to take place.

15. A non-transitory, computer-readable storage medium embodying computer program code implementing life support on a network, the computer program code comprising computer processor executable instructions configured for:
monitoring status of Link Layer Discovery Protocol (LLDP) implemented neighbor or interconnected devices as to temperature and network level events of the devices;
receiving LLDP attributes from the neighbor or interconnected devices to determine if local or network event has occurred, wherein LLDP attributes include temperatures of, event conditions based on threshold temperatures of, and actions to be taken on neighbor or interconnected devices;
determining if a life support event occurs based on monitored status of the devices;
prioritizing devices and services to support a life support if the life support event is determined;
monitoring changes as to the devices and life support event; and
returning to normal operation if the devices and life support are monitored as normal.

16. The non-transitory, computer-readable storage medium of claim 15, wherein the monitoring comprises identifying of status of individual devices, where each device provides status.

17. The non-transitory, computer-readable storage medium of claim 15, wherein the monitoring status and determining implement LLDP and status is provided as type, length, and value (TLV).

18. The non-transitory, computer-readable storage medium of claim 15, wherein the life support comprises various stages and implementing safety options based on a particular stage.

19. The non-transitory, computer-readable storage medium of claim 15, wherein the determining is based on predetermined threshold values.

20. The non-transitory, computer-readable storage medium of claim 15 further comprising confirming the life support event and allowing the life support to take place.

* * * * *